March 24, 1970  J. N. McMILLAN  3,502,250
MACHINE FOR FINISHING TROUSERS
Filed April 8, 1968  13 Sheets-Sheet 6

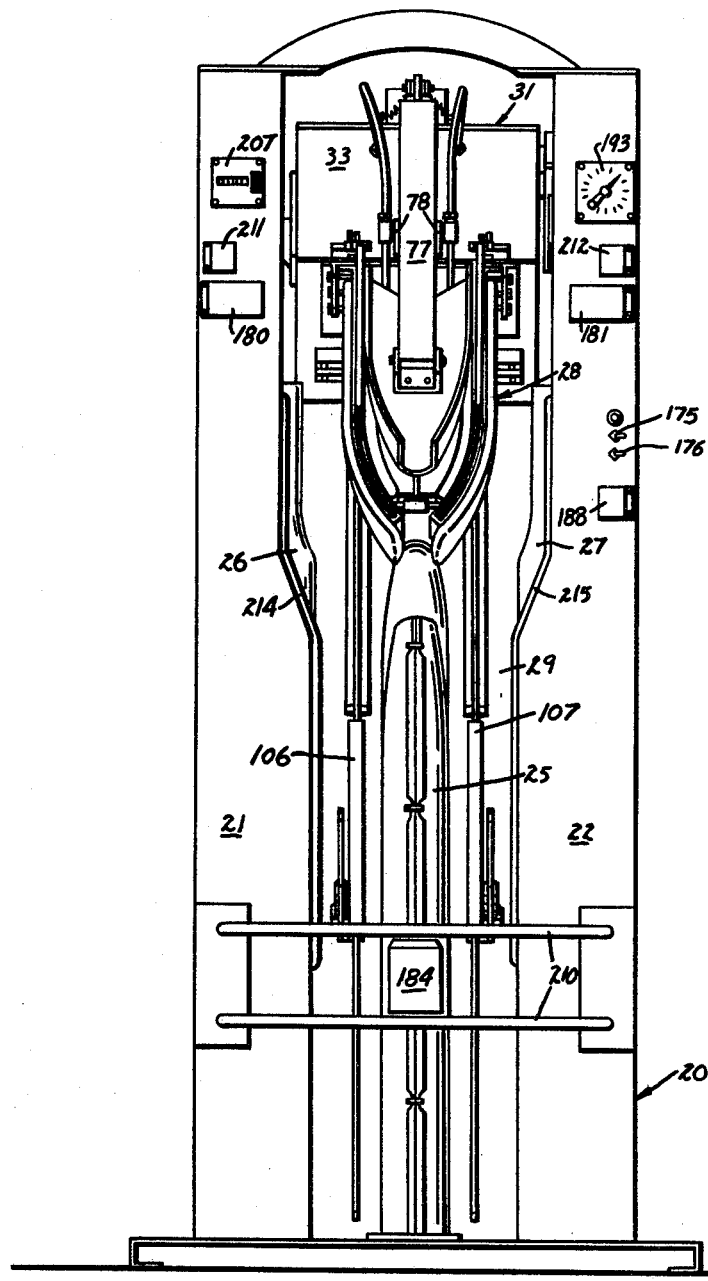

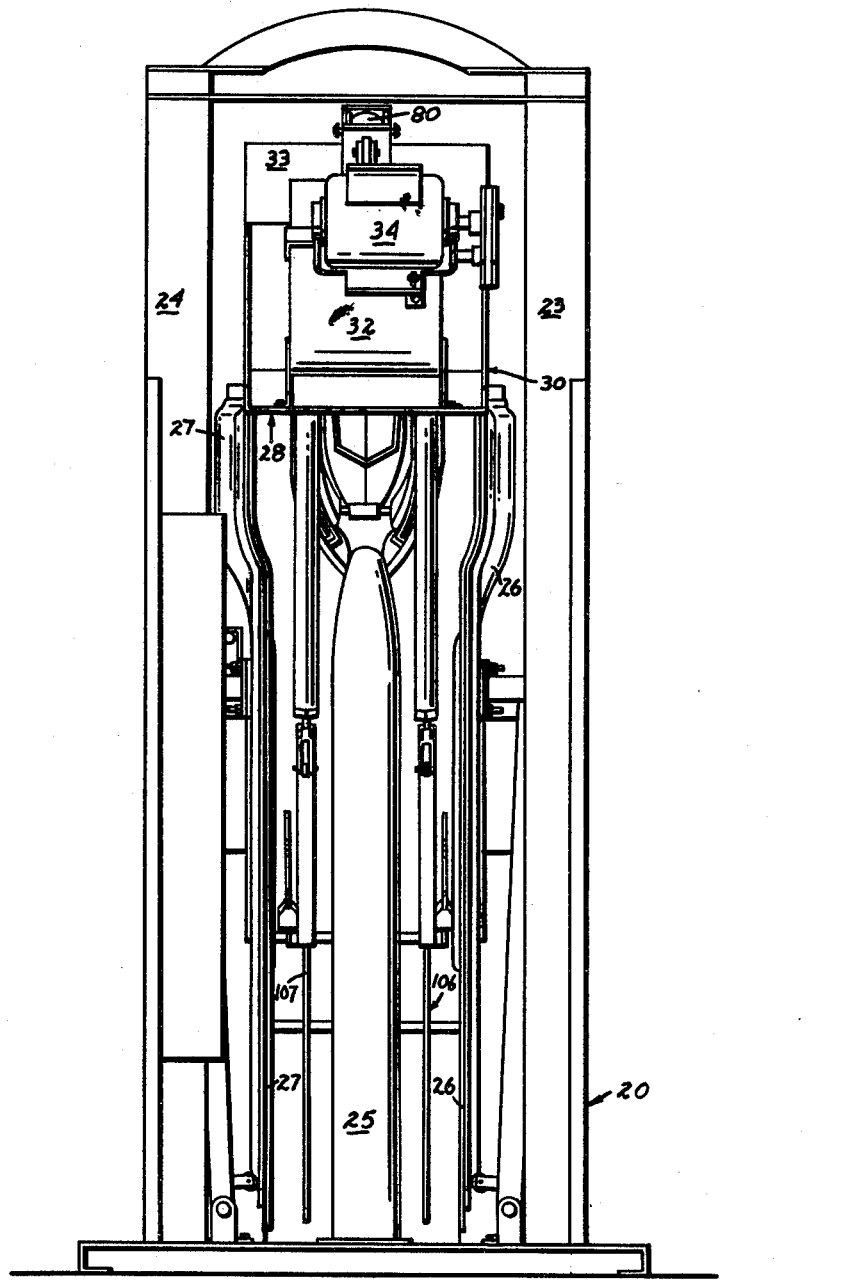

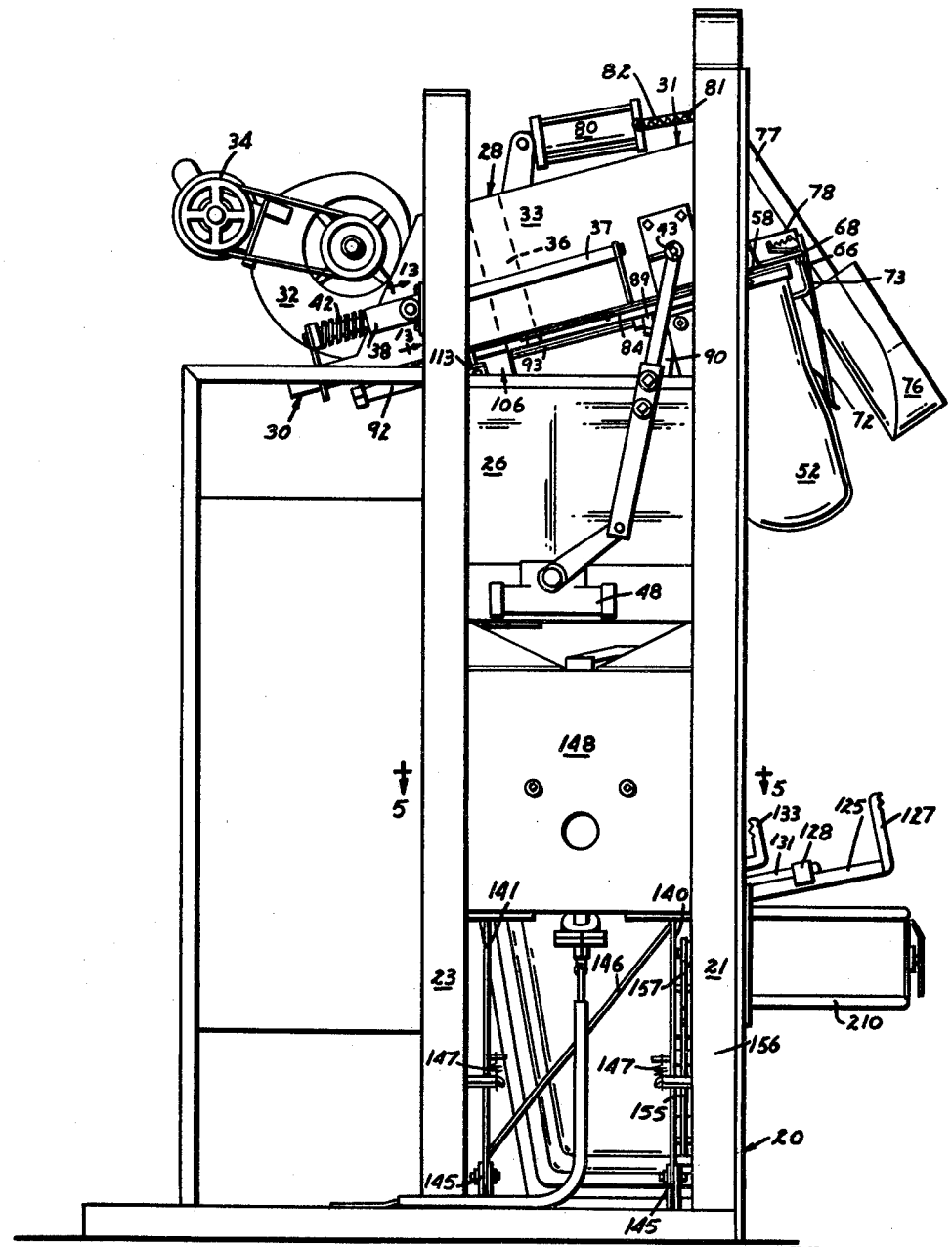

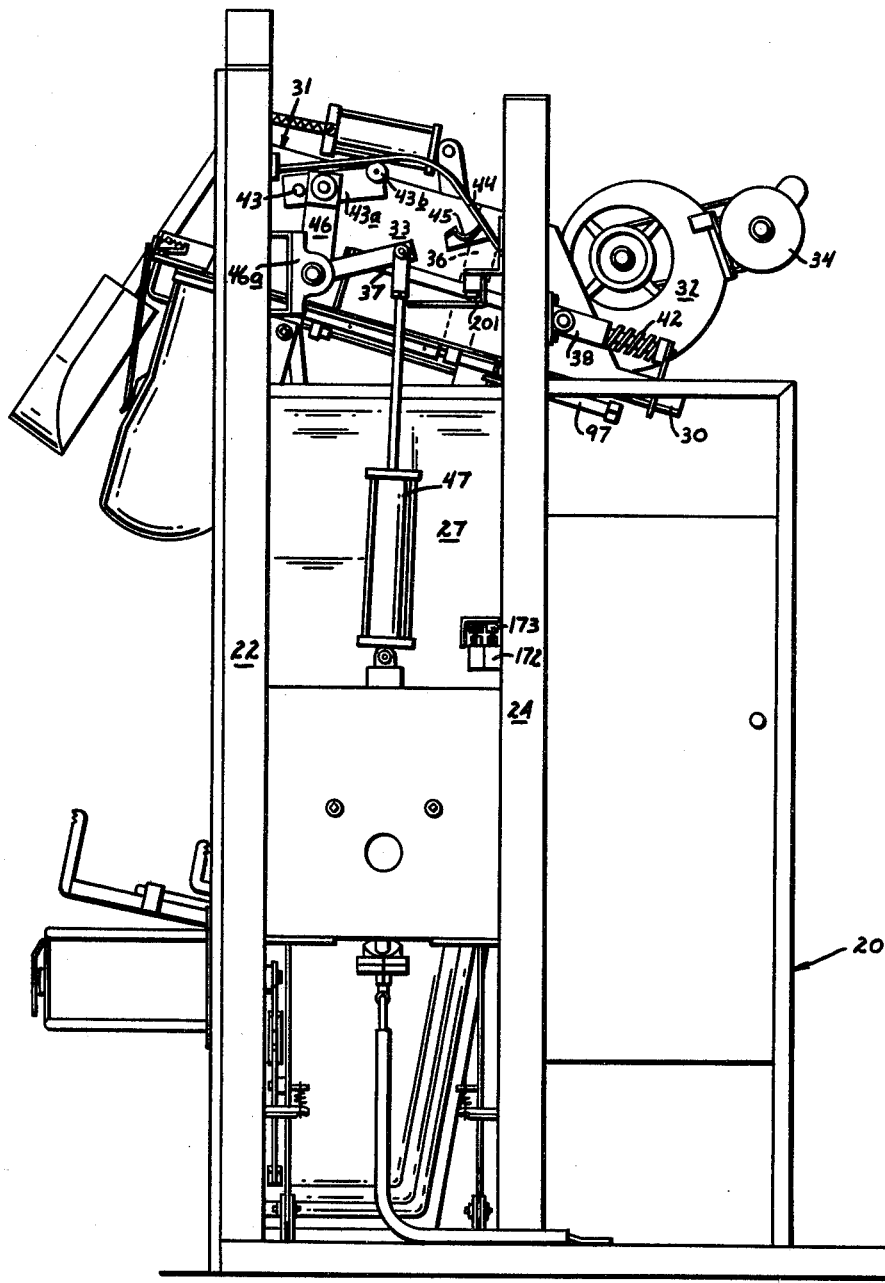

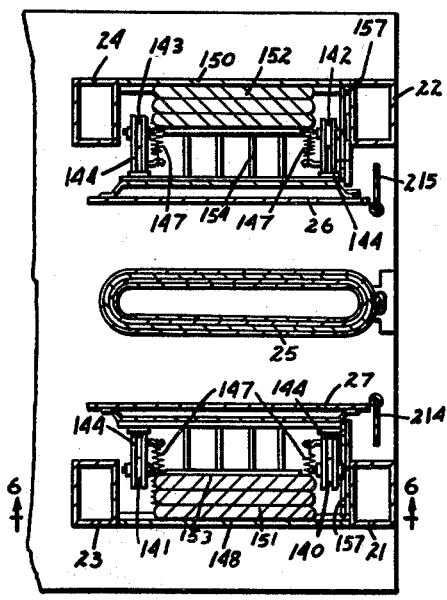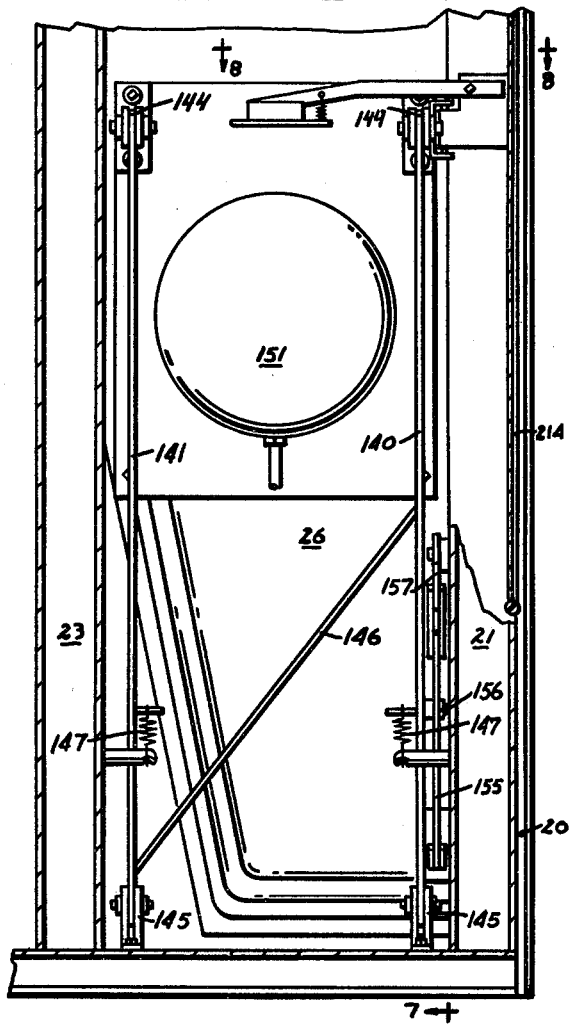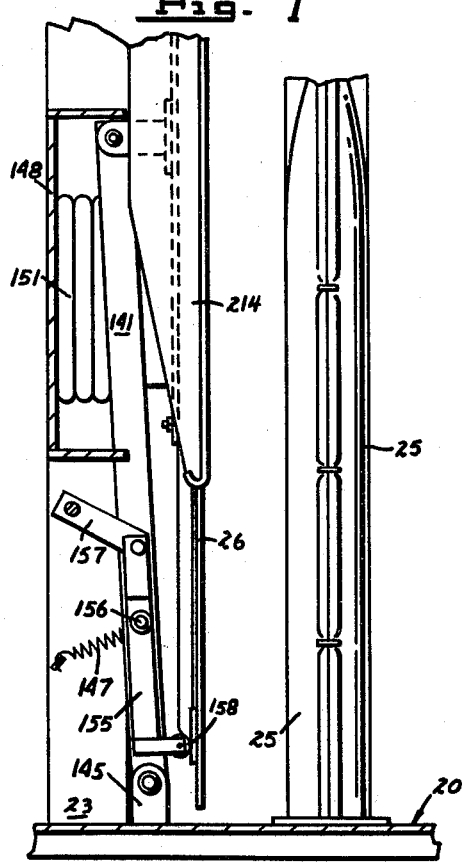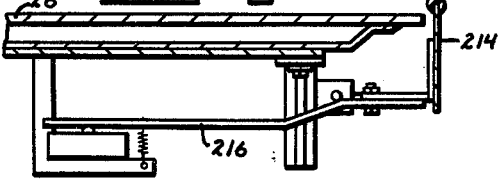

INVENTOR.
JERRY N. McMILLAN
BY
ATTYS.

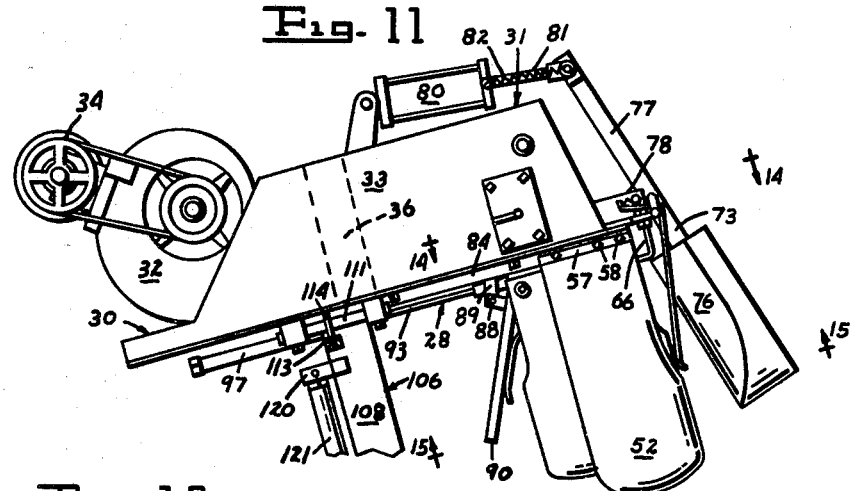
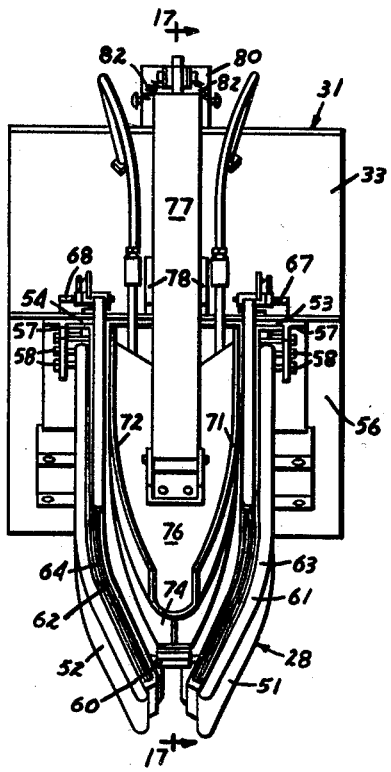
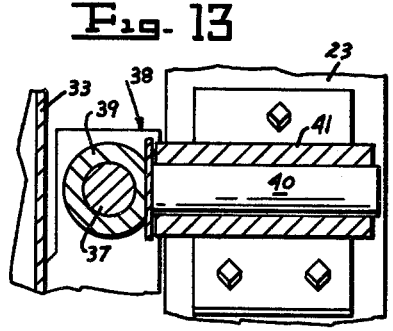
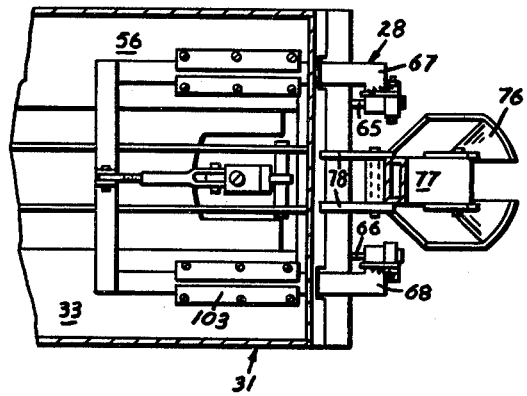
INVENTOR.
JERRY N. McMILLAN

March 24, 1970  J. N. McMILLAN  3,502,250
MACHINE FOR FINISHING TROUSERS
Filed April 8, 1968  13 Sheets-Sheet 9
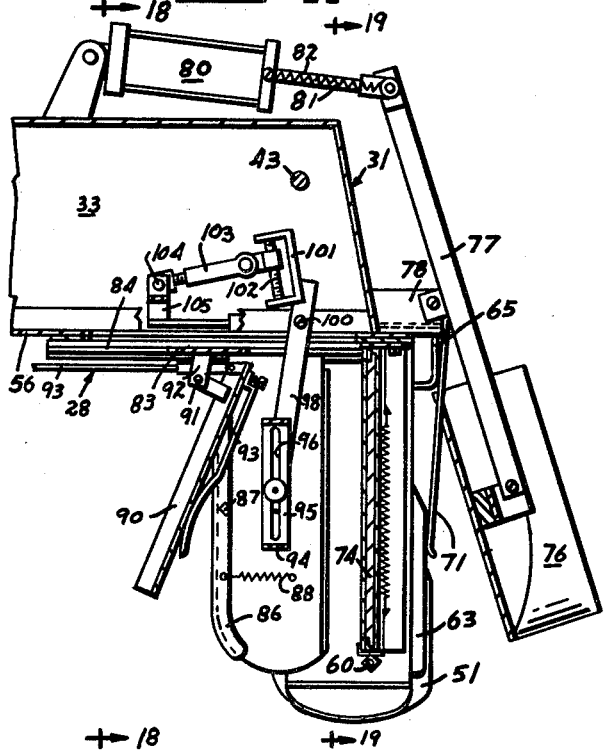
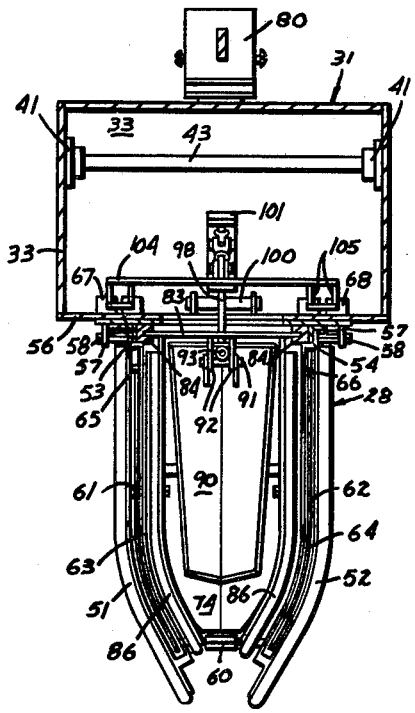
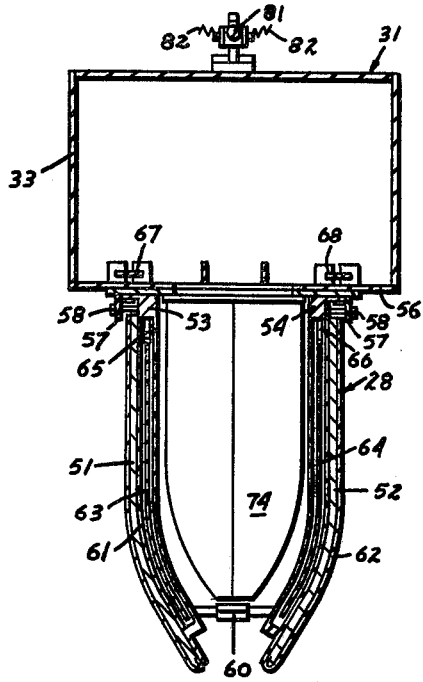
INVENTOR.
JERRY N. McMILLAN
BY
ATTYS.

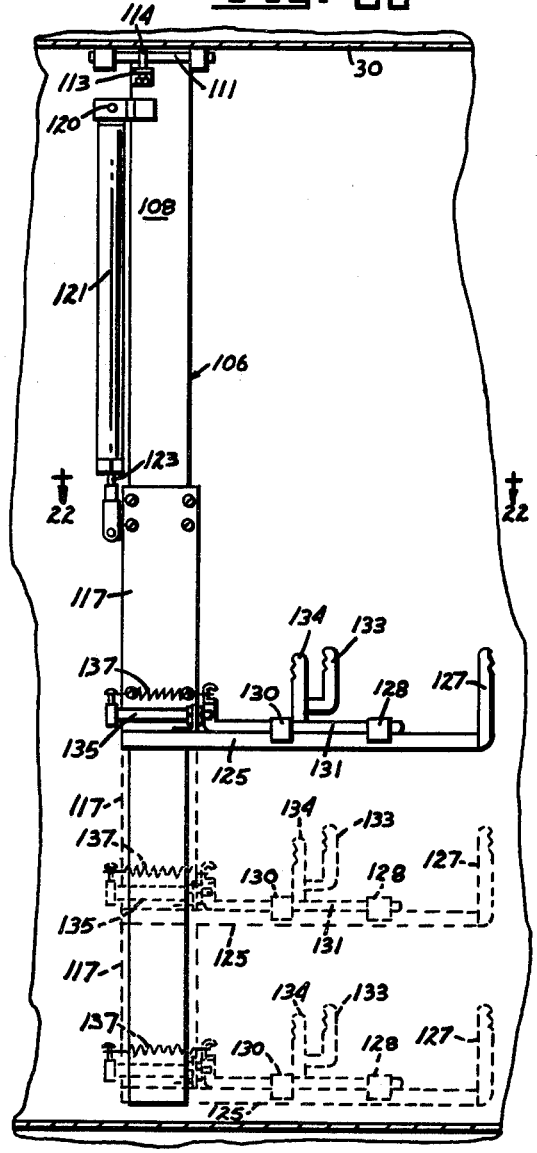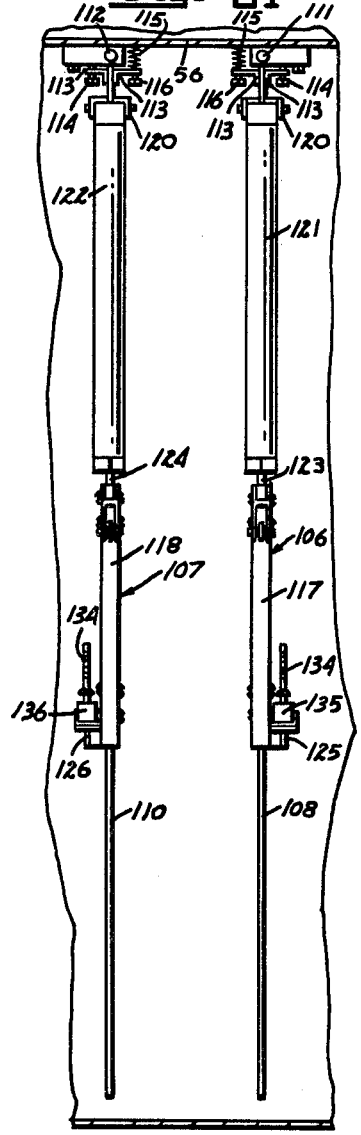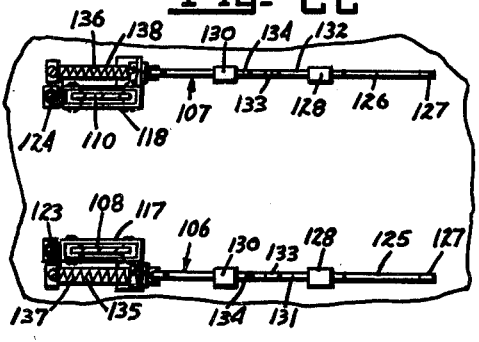

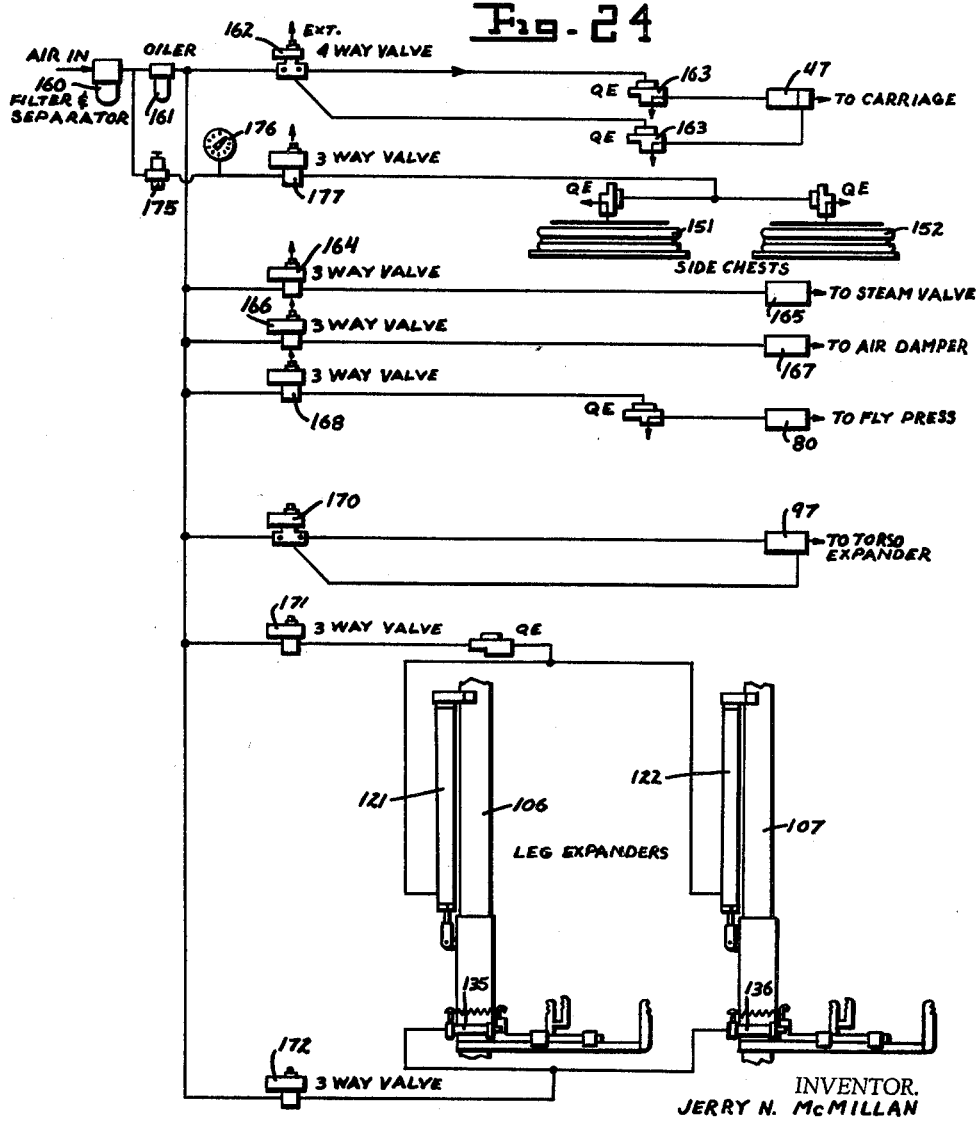

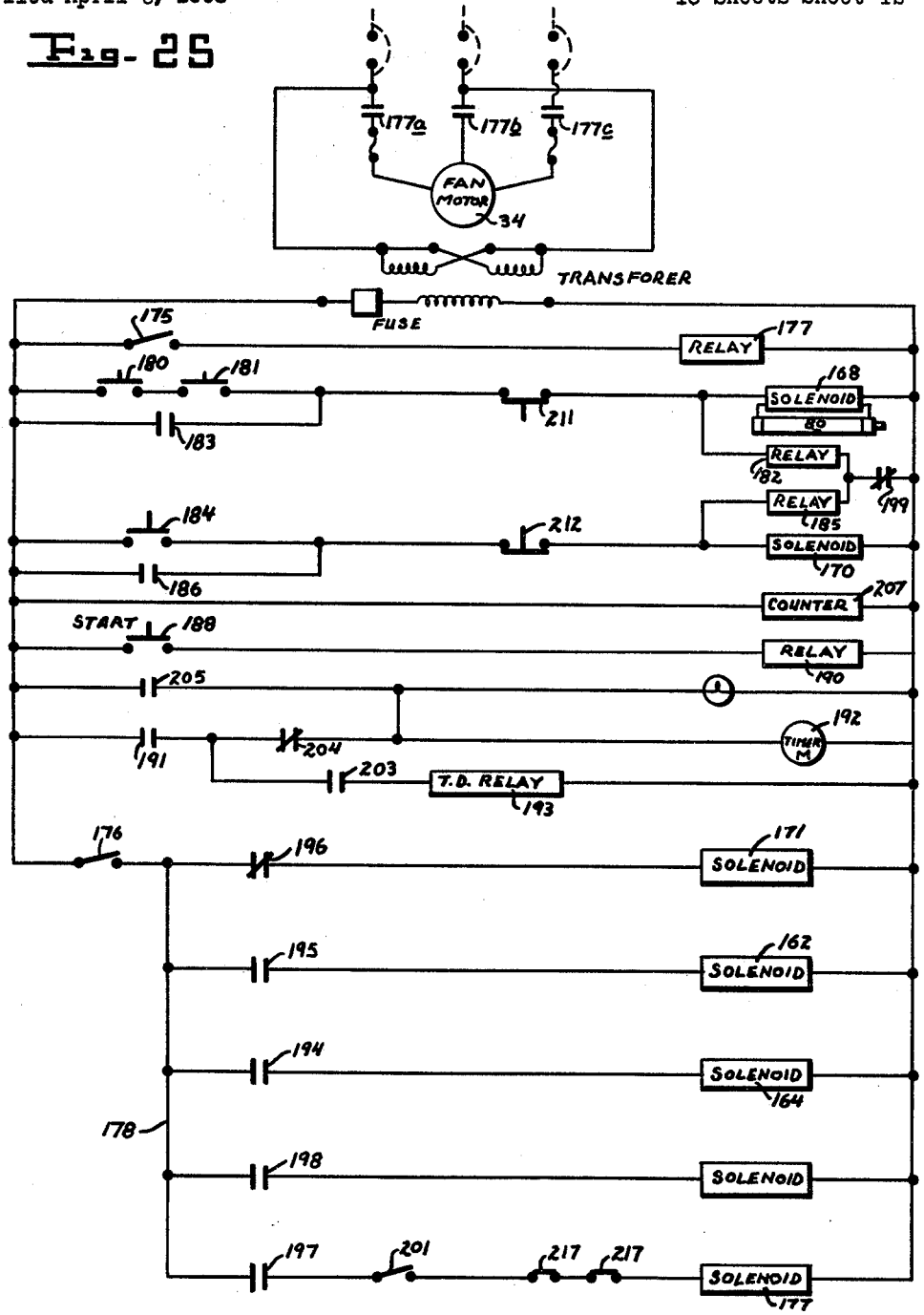

March 24, 1970  J. N. McMILLAN  3,502,250
MACHINE FOR FINISHING TROUSERS
Filed April 8, 1968  13 Sheets-Sheet 13

INVENTOR.
JERRY N. McMILLAN
BY
Wells & St. John

United States Patent Office 3,502,250
Patented Mar. 24, 1970

3,502,250
MACHINE FOR FINISHING TROUSERS
Jerry N. McMillan, Box 167 Colville, Wash. 99114
Continuation-in-part of application Ser. No. 633,224,
Apr. 24, 1967. This application Apr. 8, 1968, Ser.
No. 725,560
Int. Cl. D06c 15/00
U.S. Cl. 223—73                                    21 Claims

ABSTRACT OF THE DISCLOSURE

The disclosure describes a machine for finishing trousers. The machine has a frame 20 with an elongated upstanding center buck 25. A torso expanding and pressing device 28 is movably mounted on the frame 20 from a first position elevated from and forward of the center buck 25 to a second position immediately overlying the center buck 25. The torso device 28 has stationary hip bucks 51 and 52, movable front bucks 63 and 64 movable seat bucks 85, stationary fly buck 74, a movable fly press 76 and a movable back press 90 depending therefrom for receiving the torso portion of the trousers. Leg expanders 106 and 107 are attached to the torso device 28 in a depending manner for movement therewith. Side chests 26 and 27 are movably mounted on opposite sides of the center buck 25 for movement against the center buck 25, the seat bucks 85, the front bucks 63 and 64 and the hip bucks 51 and 52 for pressing the trousers from the cuffs to the waist band after supersaturated steam is injected into the interior of the trousers.

RELATED APPLICATION

This application is a continuation-in-part of a parent application Ser. No. 633,224, filed Apr. 24, 1967, entitled "Machine for Finishing Trousers," now abandoned.

BACKGROUND OF THE INVENTION

The automatic pressing and finishing of trousers presents a multitude of problems that has plagued the pressing and dry cleaning industry for years. Not only are the trousers of an unusual shape but there are so many different trouser sizes. Generally the waist band sizes of trousers vary from 28 to 44 inches and the in-seam varies from 28 inches to 38 inches.

For many years trousers were commercially pressed by hand because of the difficulty in providing machines that could perform even the simplest trouser pressing operation. Gradually machines were developed and were used in pressing the legs of the trousers. At first horizontal ironers or pressers were used in which the operator placed the trouser legs one at a time between flat horizontal platen pressers. Meanwhile, the torso portions of the trousers were pressed by hand. Gradually separate machines were developed for pressing the torso portion of the trousers. After the legs were pressed, the trousers would be moved to one or more other machines for pressing the torso portion of the trousers in somewhat of an assembly line process. Many of the machines were termed "trouser topping machines" and merely stretched the waistband of the trousers while steam and hot air were injected into the torso portion of the trousers. A few of the machines provided pressing plates for pressing the front pleats of the trousers while the torso portion was being stretched.

Many years after the introduction of the horizontal ironer, machines were developed for hanging the trousers vertically either by the cuffs or by the waistband and straddling the legs over the center buck. Side bucks closed in on the trouser legs to press the legs against the center buck. Occasionally steam and air were injected into the interior of the trousers to assist in the rejuvenation of the trousers. Generally, such machines merely stretched the waistband without actually pressing the torso portion of the trousers. It was also found that with these machines it was very easy for the operator to be burned by the hot elements of the machine and to become easily fatigued from the continual bending and reaching required to mount the trousers on the machine and from the moist, hot environment.

However, the problem still remained to develop one machine that could completely press and finish the total trouser independently of the length of the trousers and the waist band size. In my U.S. Letters Patent 3,415,430, I disclose a machine for finishing trousers in which not only are the trouser legs pressed but also a major portion of the torso section. The machine provides a torso expanding and pressing device that is positioned immediately over the center buck to provide a continuity of pressing surfaces from the trouser cuffs to the trouser waistband. The torso device has stationary hip bucks, movable seat bucks, a movably fly buck, and a movable fly press. The fly press presses the trouser fly against the fly buck. Movable side chests extend from the trouser cuffs to the waistband and move against the center buck and the torso bucks (hip bucks and seat bucks) to press the trousers from the cuffs to the waistband while the trousers are being stretched in several directions. First the trousers are being stretched between the waistband and the trouser cuffs. Secondly the trouser torso is stretched about the stationary hip bucks by the movement of the seat bucks and the fly buck. The machine is capable of lifting the torso expanding and pressing device from the center buck to facilitate the mounting of the trousers in the machine.

Even though the machine described in my co-pending application has been extremely well received in the industry, I have conceived and developed a new trouser finishing machine that has several substantial improvements and new features that are the subject of this application.

OBJECTS AND SUMMARY OF MY INVENTION

One of the principal objects of my invention is to provide a new pressing and finishing machine that is compact and requires a minimum of floor space and may be operated within an area having a ceiling as low as eight feet.

Another principal object of my invention is to provide a new pressing machine that is very convenient for the operator to operate and which enables the operator to mount the trousers on the machine away from the principal hot pressing elements of the machine to reduce the possibility of burns and to increase the comfort of the operator.

An additional object of my invention is to provide a new means for moving one pressing element against another to press a garment therebetween that is extremely compact and efficient to substantially reduce the size of the machine required to perform the necessary pressing operation.

A further object of my invention is to provide an improved torso expanding and pressing device and improved side chests that are capable of more effectively stretching and pressing the trouser torso.

An additional object of my invention is to provide a new cooperation of the torso expanding and pressing device and leg expanders to facilitate the mounting and pressing of the trousers.

A further object of my invention is to provide new safety features to protect the operator during the operation of the machine.

An additional object of my invention is to provide an improved torso expanding and pressing device that is capable of applying a uniform stretching force to the torso portion of the trousers independently of the size of the seat portion of the trousers in relationship to the waistband.

A still further object of my invention is to provide a single machine that is capable of uniformly moistening and expanding dry trousers and then pressing and drying the entire trouser.

Other objects of my invention will be readily apparent upon the reading of the description of the preferred embodiment.

My invention contemplates an apparatus for finishing trousers having a frame with an elongated front opening, which the torso expanding and pressing device is mounted for movement from a first position, forward of the center buck and side chests, through the elongated frame opening to a second position immediately above the center buck and between the side chests. More particularly my invention contemplates a torso device that is slidably and pivotally mounted for movement beween the first and second positions. My invention also contemplates compact expandible cylindrical bellows for moving the side chests to and from the center buck. A linkage system responsive to the movement of the side chests maintains the side chests parallel to the center buck. The torso expanding and pressing device has spaced stationary hip bucks, spaced seat bucks that are movably mounted between the hip bucks, spaced front bucks movably mounted between the hip bucks, a stationary fly buck, a movable fly press and a movable back press. The front bucks and the seat bucks extend to stretch the torso portion of the trousers about the hip bucks, with a uniform force throughout the torso portion of the trousers which is facilitated by adjustment members that serve as the rear edges of the seat bucks. The side chests are contoured so that the upper portion of the chests presses the front, hip and seat portions of the trousers against the respective torso bucks. Super saturated steam is injected into the interior of the trousers to moisten and balloon the trousers to remove the wrinkles prior to pressing the entire trouser.

BRIEF DESCRIPTION OF THE DRAWINGS

The preferred embodiment of my invention is illustrated in the accompanying drawings, in which:

FIG. 1 is a front view of a trouser finishing machine embodying the features of my invention:

FIG. 3 is a side view of the machine taken from the left in FIG. 1;

FIG. 4 is a side view taken from the right in FIG. 1;

FIG. 5 is a cross sectional view taken on the line 5—5 of FIG. 3;

FIG. 6 is a cross sectional view taken on the line 6—6 of FIG. 5;

FIG. 7 is a cross sectional view taken on the line 7—7 of FIG. 6;

FIG. 8 is a fragmentary cross sectional view taken on the line 8—8 of FIG. 6;

FIG. 11 is an enlarged isolated side view of the torso expanding and pressing device taken from FIG. 3;

FIG. 12 is an enlarged isolated front view of the torso expanding and pressing device taken from FIG. 1;

FIG. 13 is a cross sectional view on 13—13 in FIG. 3, showing a support mechanism for the torso device;

FIG. 14 is a fragmentary cross sectional view taken on line 14—14 of FIG. 11;

FIG. 17 is a fragmentary cross section view taken on line 17—17 in FIG. 12;

FIG. 18 is a cross sectional view taken on line 18—18 of FIG. 17;

FIG. 19 is a cross sectional view taken on line 19—19 of FIG. 17;

FIG. 20 is an isolated view of leg expanders showing several extended positions in phantom;

FIG. 21 is an enlarged isolated rear view of the leg expanders;

FIG. 22 is a cross sectional view of the leg expanders taken on line 22—22 of FIG. 20;

FIG. 23 is a diagram showing the timing of the sequence of operation;

FIG. 24 is a line diagram illustrating the pneumatic system for operating several of the principal elements of the machine;

FIG. 25 is a line diagram illustrating the electrical system for activating the machine; and FIG. 26 is a schematic diagram illustrating the steam and water system for heating the bucks and moistening and ballooning the trousers.

DESCRIPTION OF THE PREFERRED EMBODIMENT

Figure 9:
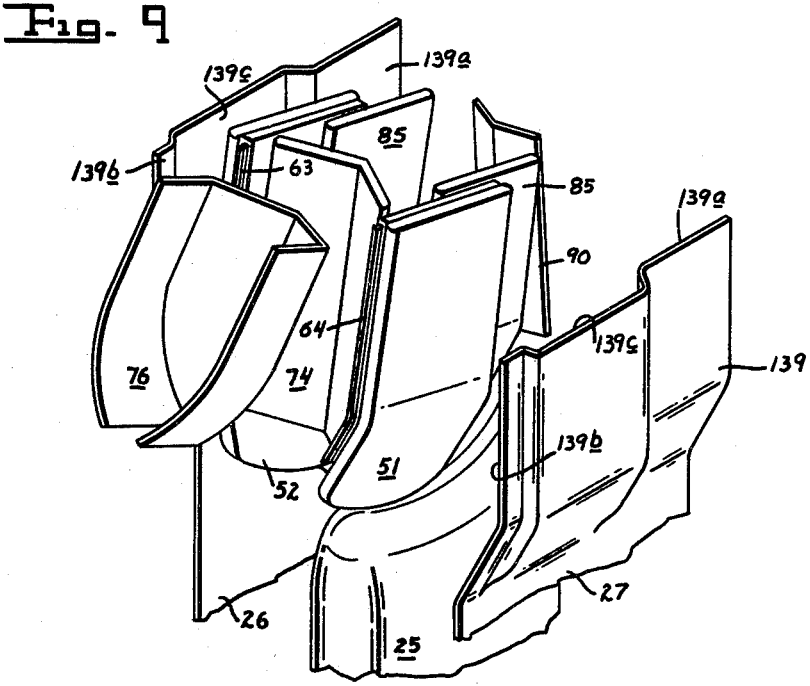
FIG. 9 is a perspective schematic view of the principal elements of a torso expanding and pressing device when the device is above and forward a center buck and side chests.

Referring now in detail to the drawings, the trouser finishing machine (FIGS. 1 through 4) comprises a frame 20 having front upright supports 21 and 22 and rear upright supports 23 and 24. A center buck 25 is centrally located on the frame 20 in an upright position. The center buck 25 is contoured to receive the crotch and inner leg portions of the trousers. Two elongated polished side chests 26 and 27 are movably mounted opposing the sides of center buck 25 for pressing the major portion of the trousers. A torso expanding and pressing device 28 is movably mounted on the frame uprights. An unobstructed aperture 29 is formed in the frame 20 between the uprights 21 and 22. The torso expanding and pressing device 28 is movable from a first position extending from the frame 20 through the aperture 29 and forward of the center buck 25 and the side chests 26 and 27 to a second position between the side chests 26 and 27 and immediately overlying the center buck 25. When the torso device is in the first position as shown in FIGS. 1–4, the operator places the waistband of the trousers over the expanding and pressing elements.

The machine described herein is considerably smaller than the machine disclosed in my prior co-pending application. Because of the size and weight reduction, it costs 60% less to transport this machine. Furthermore, this machine is capable of being efficiently operated in an area that has a ceiling as low as eight feet.

TORSO EXPANDING AND PRESSING DEVICE

As may be seen in FIGS. 3, 4 and 11, the torso expanding and pressing device 28 has a housing 33 with a rear section 30 and a forward section 31.

A fan 32 (FIGS. 3, 4 and 11) for supplying air to the torso device is mounted on the rear section. The fan is driven by a motor 34 mounted on the outside of the fan housing. The air supply produced by the fan 34 passes through a steam coil 36 mounted in the housing 33 shown in phantom outline in FIGS. 3, 4 and 11. The hot air then passes to the forward section 31 where the flow is deflected downwardly into the interior of the mounted trousers.

The torso device 28 is pivotally and slidably mounted on the frame 20 for movement from the first to the second positions through the front opening 29. Support and guide rods 37 are mounted to the sides of the housing 33 substantially parallel with the longitudinal axis of the housing 33. The guide rods 37 are slidably and pivotally supported in slide bearings 38 that are rotatably mounted to the frame uprights 23 and 24. A cross sectional detail of the slide bearings 38 is illustrated in FIG. 13. Each slide bearing has a tube 39 for slidably receiving one of the rods 37 and a shaft 40 extending from the tube 39 that is rotatably supported in a frame bearing 41. Compression springs 42 are mounted about the rods 37 between the slide bearings 38 and the rear ends of the rods 37 for cushioning the forward extended movement of the torso device 28.

A drive means is operably connected to the torso device for moving the torso device from the first position to the second position and back. The drive means includes a rotatable shaft 43 that extends transversely through the forward section of the housing 33 as may be seen in FIGS. 3, 4, 17 and 18. As shown in FIG. 4, a pivot arm 43a is secured to and radially extends from one end of the shaft 43. A roller wheel 43b is rotatably mounted on the end of the arm 43a. A contoured track 44 is mounted between the uprights 22 and 24 for receiving and guiding the roller 43b. As the roller 43b moves along the track 44, the axis of the roller 43b serves as a moving pivot axis for the arm 43a and the shaft 43.

A stop 45 is secured to the track 44 to receive and stop the movement of the roller 43b along the track 44.

A bell crank 46 is pivotally mounted to a bearing 46a that is secured to the upright 22. One end of the bell crank 46 is pivotally attached to the pivot arm 43a spaced from the roller 43b. The other end of the bell crank is pivotally connected to a connecting rod of a fluid operated piston-cylinder actuator 47. The actuator 47 is pivotally mounted to the frame 20 so that it may pivot while moving the bell crank 46. As shown in FIG. 3, a shock absorber 48 is operably connected to the other end of shaft 43 for cushioning the drive means and for applying a torque to the shaft 43 to bias the roller 43b against the track 44.

When the connecting rod of the actuator 47 is extended, the bell crank 46 is pivoted counterclockwise (FIG. 4) to pivot the arm 43a clockwise about the axis of the roller 43b and to also move the roller 43b along the track 44. As the connecting rod extends the torso device pivots upwardly and slides forward through the opening 29 between the uprights 21 and 22 to the first position. As the connecting rod retracts, the torso device slides rearwardly back through the opening 29 and pivots downward to the second position immediately overlying the center buck 25 and between the side chests 26 and 27.

Because of the compound pivoting of the bell crank 46 and the roller 43b and the movement of the pivotal axis of the roller 43b along the contoured track 44, the torso device simultaneously pivots downwardly and moves translationally rearward along its axis from the first position to the second position.

Further details of the torso device 28 are shown in FIGS. 9 through 19. The torso device 28 has depending spaced parallel hip bucks 51 and 52 stationarily mounted to the underside of the housing 33. When the torso device 28 is in the second position, the hip bucks 51 and 52 straddle the center buck 25 between the side chests 26 and 27 so that the hip portions of the trousers may be properly pressed between the side chests 26 and 27 and the hip bucks 51 and 52. The hip bucks 51 and 52 are attached to the side of mounts 53 and 54 (FIG. 12) respectively, which are in turn secured to a base plate 56 affixed to the underside of the housing 33. The mounts 53 and 54 are secured to the base plate 56 by brackets 57 and bolts 58. A turn buckle 60 extends between the lower portions of the mounts 53 and 54 for adding structural integrity to the hip bucks and to provide for adjustment of the spacing between the lower portions of the hip bucks 51 and 52 for proper alignment with the saddle section of the center buck 25. If desired the movement of the torso device may be adjusted so that when the torso device is immediately above the center buck the lower ends of the hip bucks abut the center buck.

The mounts 53 and 54 (FIG. 19) have narrow cavities 61 and 62 formed therein respectively. Thin front bucks 63 and 64 are housed within the cavities 61 and 62 respectively. The front bucks 63 and 64 are reciprocally mounted in the cavities by L-shaped rods 65 and 66. The L-shaped rods 65 and 66 extend from the forward portions of the front bucks 63 and 64 to slides 67 and 68 (FIGS. 12 and 14). The slides 67 and 68 are reciprocally mounted to the inside of the housing 33 and extend forward of the housing 33. The slides 67 and 68 are slidably mounted in brackets that are affixed to the inside of the housing 33. Front clamps 71 and 72 (FIGS. 11 and 12) are pivotally mounted to the slides 67 and 68 respectively for movement against the front bucks 63 and 64. Springs 73 are attached to the clamps 71 and 72 to resiliently pivot the clamps 71 and 72 to hold and to align the trousers to the torso expanding and pressing device 28.

Figure 15:
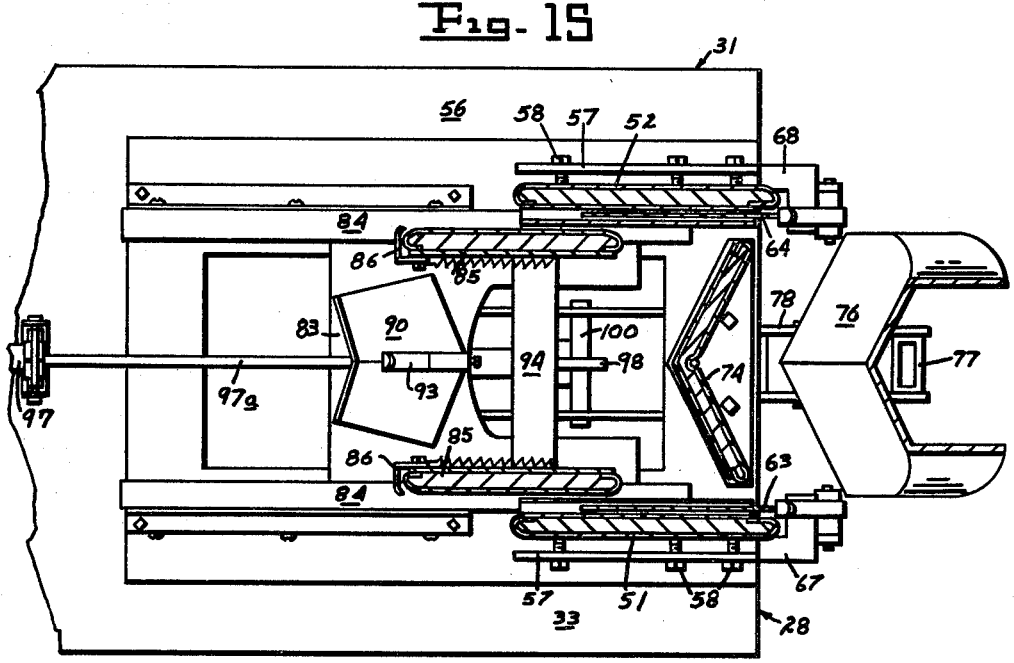
FIG. 15 is a fragmentary cross sectional view taken on line 15—15 of FIG. 11 showing the torso device in the retracted and open position as viewed from underneath.
Figure 16:
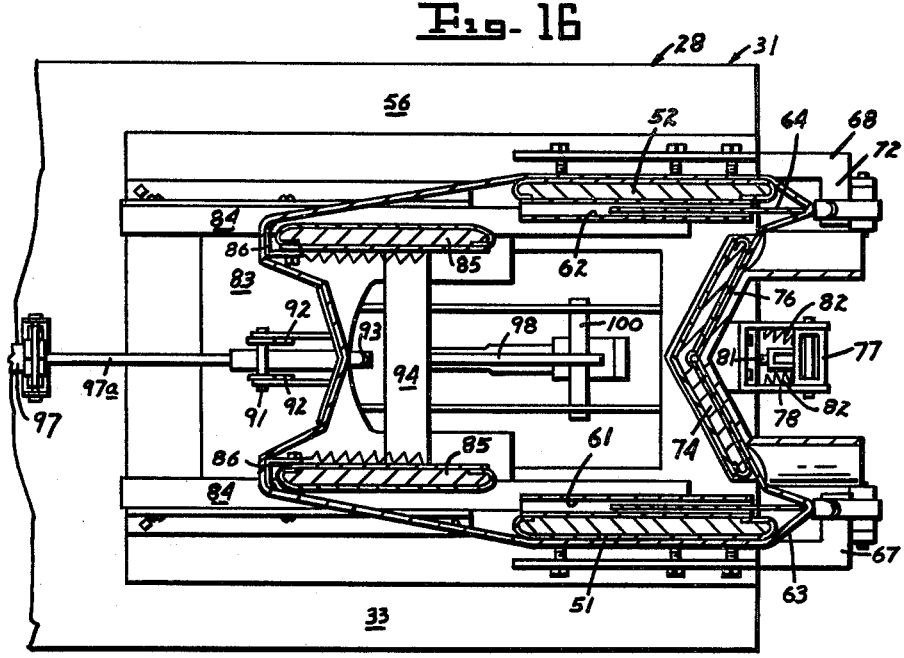
FIG. 16 is a fragmentary cross sectional view similar to FIG. 14 except showing the torso device in the extended and closed position.

As may be particularly seen in FIGS. 12, 15 and 16, a V-shaped fly buck 74 is stationarily mounted to the torso device 28 in a depending manner between the hip bucks 51 and 52 to receive the fly portion of the trousers. The fly buck 74 is secured to the base plate 56.

A fly press 76 having a complementary V-shape to the fly buck 74 is pivotally mounted to the housing 33. Specifically, the fly press 76 (FIGS. 12 and 14) is pivotally mounted on an arm 77 which is in turn pivotally mounted to a bracket 78 attached to the front of the housing 33.

The arm 77 is pivoted to move the fly press against the fly buck to press the trouser fly therebetween by a drive mechanism mounted to the torso housing 33. The drive mechanism specifically includes a fluid operated actuator 80 (FIG. 11) having a connection rod 81 attached to the end of the arm 77. Tension springs 82 are connected between the end of the arm 77 and the actuator 80 to resiliently pivot the fly press 76 from the fly buck 74 when the actuator 81 is not pressurized.

A U-shape plate 83 (FIGS. 15–17) is movably mounted beneath the housing 33 for reciprocal movement. The U-shaped plate 83 is slidably supported on the sides by guide bearing 84. Spaced parallel seat bucks 85 are mounted depending from the plate 83 between the hip bucks 51 and 52. As may be best seen from the underside as shown in FIGS. 15 and 16, the seat bucks are movable with the plate 83 from a retracted position immediately between the hip bucks to an extended position longitudinally spaced from the hip bucks as shown in FIG. 16.

Each of the seat bucks 85 has an edge member 86 (FIG. 17) that is self-centering to uniformly stretch the trousers from the crotch to the waistband when the seat bucks are extended. The edge member 86 is pivotally mounted to the rear edge of the seat bucks for oscillating movement about the bolt shaft 87. Tension springs 88 extend between the lower section of the edge member 86 and the body of the seat bucks to pivot the lower section of the edge member inwardly to facilitate the mounting and removal of the trousers. When the seat and front bucks are extended to stretch the trouser torso about the hip bucks, the edge members 86 move abainst the trouser seat and pivot about the bolt shaft 87 until a uniform stretching force is applied. If the trouser waistband is smaller than the lower portion of the torso section, then the edge members will pivot so that the lower section swings outward and the upper section moves inward to uniformly stretch the torso section about the hip bucks 51 and 52.

A V-shaped back press 90 is pivotally mounted to the underside of the reciprocable plate 83 between the spaced seat bucks 85 for pressing against the back or tail bone of the trousers. A shaft 91 (FIGS. 16, 17 and 18) is mounted transversely below the plate 83 by brackets 92. The back press is pivotally mounted to the shaft 91 for inward movement to press the back portion of the trouser inward between the seat bucks 85. A spring clip 93 is mounted to the inside of the back press to hold the back of the trousers on the torso device.

The seat bucks 85 are separated by a cross brace 94. Spaced vertical brackets 95 (FIG. 17) extend upward from the cross brace 94. The brackets 95 have elongated apertures 96 formed therein.

The torso device 28 has a drive means for extending the seat bucks 85 and the front bucks 63 and 64 and for pivoting the back press 90 to stretch the trouser torso about the stationary hip bucks 51 and 52. The drive means includes a fluid operated piston-cylinder actuator 97 that is mounted to the underside of the rear section of the housing 33. The connecting rod 97a of the actuator 97 extends forward and is connected to the back press 90 offset from the pivot shaft 91 (FIG. 17). As the connecting rod 97a is initially retracted the back press 90 is pivoted forward about the shaft 91 until the press is in a substantially perpendicular depending position with respect to the longitudinal axis of the torso device. Further retraction of the connecting rod pulls the plate 83 rearward to extend the seat bucks 85.

An adjustable linkage system interconnects the seat bucks 85 and the front bucks 63 and 64 to move the front bucks forward from between the hip bucks as the seat bucks 85 are being moved rearward. The linkage system is adjustable so that the ratio of movements between the front bucks and the seat bucks may be varied as desired. Specifically, as may be seen in FIGS. 14–19 the linkage system includes a pivot arm 98 that is mounted on a rotatable shaft 100 mounted transversely in the front section of the housing 33 intermediate the slides 67 and 68 (FIG. 14). One end of the arm 98 extends downwardly from the housing 33 and is slidably mounted in the apertures 96. The other end of the arm 98 extends upward and is connected to an adjustment bracket 101 that houses an adjustment screw 102. A linkage member 103 extends between the screw 102 and a transverse bar 104. The bar 104 is supported on brackets 105 that are affixed to the upper side of the slides 67 and 68. The moment distance between the shaft 100 and the connection of the linkage member 103 with the arm 98 may be varied by turning the screw 102 to move the linkage member along the screw 102. In this manner the ratio of the movements of the front bucks 63 and 64 and the seat bucks 85 is varied. It has been found that best results have been achieved when the seat bucks move rearward approximately 2½ inches for every inch the front bucks move forward.

As the seat bucks 85 are drawn rearward by the actuator 97, the arm 98 pivots clockwise as viewed in FIG. 17 about the shaft 100 with the lower end of the arm 98 sliding upwardly in the aperture 96. The upper end of the arm 98 swings forward pulling the bar 104 to move the slides 67 and 68 forward thereby extending the front bucks as is shown in FIG. 16 to stretch the trouser torso about the hip bucks 51 and 52.

LEG EXPANDERS

Leg expanders 106 and 107 are mounted to the underside of the rear section 30 and extend downward between the side chests 26 and 27 and the center buck 25 as may be seen in FIG. 1 for (1) stretching the trousers lengthwise between the cuffs and the waistband; (2) aligning the side seams of the trouser legs; and (3) properly positioning the trouser legs with respect to the side chests 26 and 27 and the center buck 25. The leg stretchers 106 and 107 (FIGS. 20–22) are mounted to the rear section 30 for movement with the torso device in such a manner as to enable the leg expanders to swing laterally but not longitudinally in relationship to the torso device 28. The leg expanders 106 and 107 have flat bars 108 and 110 respectively. Shafts 111 and 112, affixed to the upper ends of the bars 108 and 110 respectively, are rotatably mounted to the under side of section 30 parallel to the longitudinal axis of the housing 33.

Brackets 113 (FIG. 21) are attached to the flat bars 108 and 110 and extend outwardly on both sides. Adjustable screws 114 are threaded through the outer protrusions of the brackets 113 for engaging the underside of the housing 33 to limit the outward lateral swing of the leg expanders. Springs 115 are positioned between the housing 33 and the inner projections of the brackets 113 to resiliently resist the inward pivotal movement of the flat bars 108 and 110. Adjustable set screws 116 are threaded through the inner projections of the bracket 113 for engaging the springs 115 to adjust the compressive resistance of the springs.

Flat bars 108 and 110 have cuff expanders 117 and 118 slidably mounted thereon respectively. Each of the flat bars have a bracket 120 mounted near the upper end for supporting fluid operated actuators 121 and 122. Actuator 121 has a connecting rod 123 that is attached to the cuff expander 117. Actuator 122 has a connecting rod 124 that is connected to the cuff expander 118. When the actuators 121 and 122 are activated, the connecting rods 123 and 124 are retracted to lift the cuff expanders 117 and 118. When the actuators are deactivated, the cuff expanders slide down along the bars 108 and 110 by gravity.

A horizontal flat bar 125 is mounted to the lower end of the cuff expander 117 and extends forward between the side chest 26 and the center buck 25. A similar flat bar 126 is mounted to the lower end of the cuff expander 118 and extends forward between the side chest 27 and the center buck 25. Each of the horizontal flat bars 125 and 126 has an upstanding cuff receiving portion 127. Further, each of the horizontal flat bars 125 and 126 has upwardly extending guides 128 and 130 mounted thereto.

Cuff bars 131 and 132 are slidably mounted on the upper surface of the horizontal flat bar 125 and 126 respectively. The cuff bars 131 and 132 are slidable in the guides 128 and 130. Each of the slidable cuff bars 131 and 132 has upstanding cuff receiving portions 133 and 134. A drive means is connected to the cuff bars 131 and 132 for sliding the bars forward with respect to the horizontal flat bars 125 and 126. The drive means includes fluid operated actuators 135 and 136 mounted to the cuff expanders 117 and 118 respectively. The actuators 135 and 136, when pressurized, move the bars 131 and 132 forward to release the trouser cuffs. Springs 137 and 138 are connected between the actuators 135 and 136 and their respective cuff bars 131 and 132 for moving the cuff bars 131 and 132 rearward to stretch the trouser cuffs.

Since the leg expanders 106 and 107 are unable to pivot longitudinally with respect to the torso device, the leg expanders move forward and back with the torso device 28. When the torso device 28 is in the first position in the front of the center buck 25, the leg expanders 106 and 107 extend through the opening 29 with the cuff expanding elements projecting in front of the uprights 21 and 22 as may be seen in FIGS. 3 and 4. As the torso device is pivoted and transversely moved to the second position, the leg expanders swing back through the opening 29 and between the side chests 26 and 27 and the center buck 25 to present the trouser legs substantially aligned with the center buck and the side chests.

SIDE CHESTS

Figure 2B:
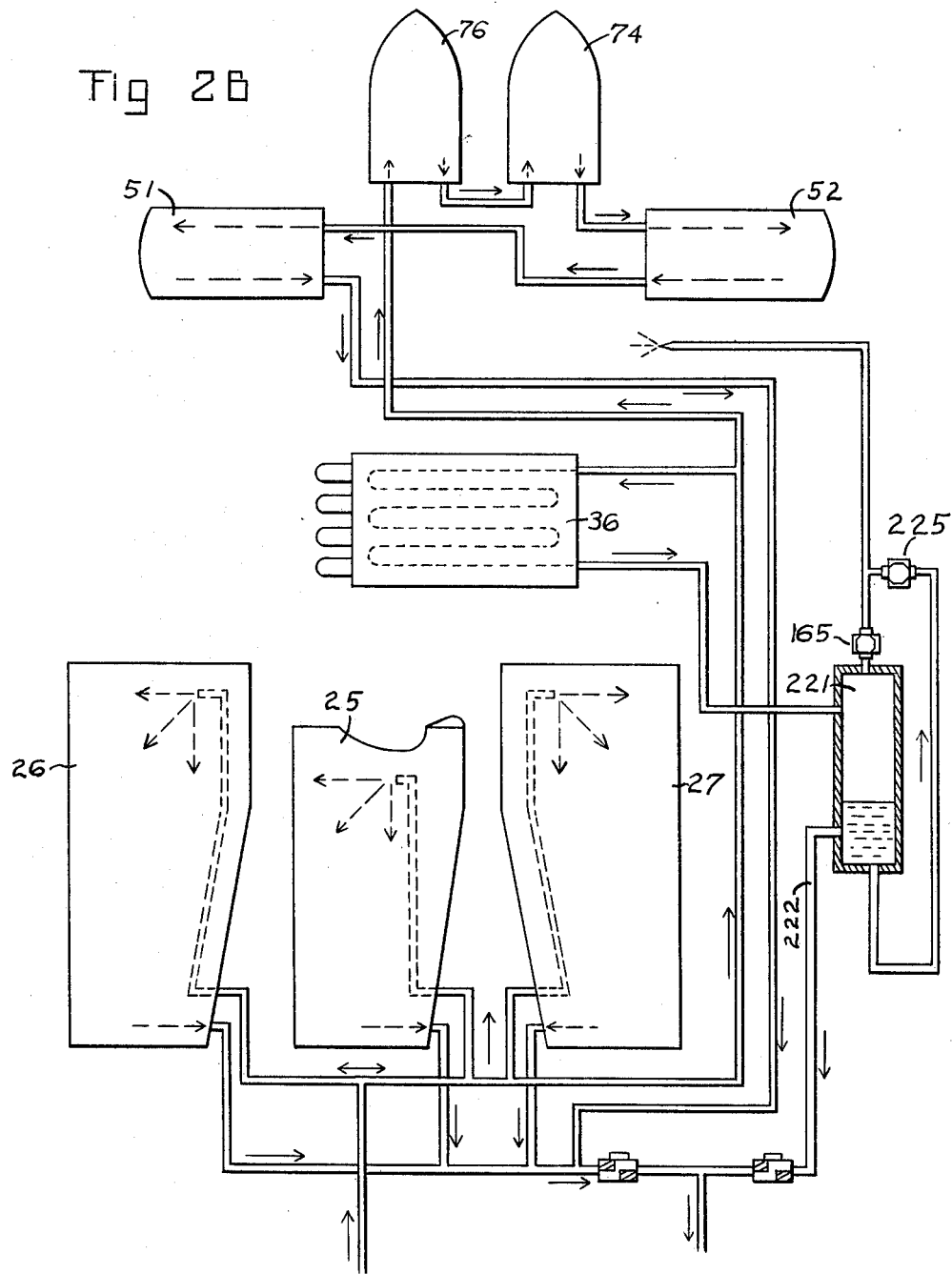
FIG. 2 is a rear view of the machine.

The side chests 26 and 27 as seen in FIGS. 1 and 2 are mounted substantially upright in parallel alignment with the center buck 25. The side chests extend from below the trouser cuffs to above the waistband for pressing the trouser legs against the center buck and the major portions of the trouser torso against the torso bucks as previously described. The contoured polished inner surfaces of the side chests face the center buck 25 and are mirror images of each other to effectively press the trousers against the bucks.

Figure 10:
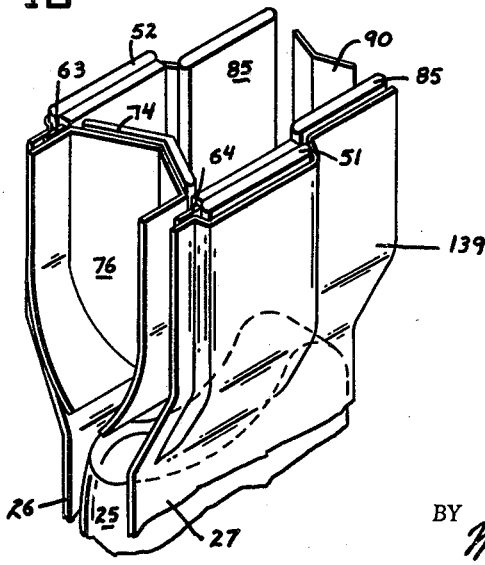
FIG. 10 is a perspective schematic view similar to FIG. 9 except showing the relationship of the principal elements of the torso expanding and pressing device and the center buck and the side chests with the device immediately overlying the center buck.

The inner surfaces of the lower section of the side chests are substantially flat and extend from a position below the trouser cuffs to a location adjacent the saddle area of the center buck 25. The inner surfaces of the upper section 139 of the side chests extend outwardly and upwardly from the lower sections. As illustrated in FIGS. 9 and 10, the inner surfaces of the upper sections 139 are contoured to complement the torso bucks. Specifically, the upper sections 139 have outwardly and upwardly extending surfaces 139a for pressing the seat portion of the trousers against the seat bucks 51 and 52. The upper sections 139 have outwardly and upwardly extending surfaces 139b that are spaced forward of the surfaces 139a for pressing the front portions of the trousers against the front bucks 63 and 64. Indented surfaces 139c are formed in the upper sections 139 intermediate the surfaces 139a and 139b for pressing the hip portions of the trousers against the hip bucks 51 and 52.

As may be particularly seen in FIGS. 5, 6 and 7, the side chests 26 and 27 are pivotally mounted to the frame 20 for moving against the center buck 25. Side chest 26 is pivotally mounted on rocker arms or bars 140 and 141. Side chest 27 is pivotally mounted on rocker arms or bars 142 and 143. The rocker arms extend from bearing brackets 144, that are attached to the backs of the side chests, to bearing brackets 145 that are mounted at the base of the frame 20. Cross supports 146 extend between the rocker arms 140 and 141 and between rocker arms 142 and 143 to provide structural rigidity. Springs 147 are connected between the frame uprights and rocker arms to resiliently bias the side chests 26 and 27 from the center buck 25.

An extremely compact drive means is mounted on the frame 20 for moving the side chests 26 and 27 to and from the center buck 25. To support the drive means, side plates 148 and 150 are fixed between the uprights 21 and 23 and 22 and 24 respectively. A cylindrical fluid operated bellows 151 is mounted to the side plate 148 for moving the side chest 26. A cylindrical fluid operated bellows 152 is mounted to the side plate 150 for moving the side chest 27. A pressure grid 153 is centrally mounted on the back of the side chest 26 for transmitting the bellows movement to the side chest 26. A similar pressure grid 154 is secured to the back of the side chest 27.

To maintain the side chests 26 and 27 parallel to the center buck 25 during movement, the pressing machine has a parallelogram linkage means (FIG. 7) that is responsive to the movement of the side chests for moving against the lower portion of the side chests. As may be seen in FIGS. 5 and 7, each of the rocker arms 140 and 142 has an arm or lever 155 rotatably mounted thereto for rotation about point 156. The lower end of each arm 155 has a bracket mounted thereon for supporting a pressure wheel 158 that engages the lower portion of the side chests. When the side chests move, the linkage 157 rotates the arms 155 to move the pressure wheels 158 with the lower portion of the side chest to maintain the chests parallel to the center buck.

PNEUMATIC SYSTEM

Many of the principal elements of the machine are operated by the fluid pressure system illustrated in FIG. 24. Air under pressure is supplied to the machine from an exterior source. The air passes through a filter and liquid separator 160. The main line branches into two branches. The first branch passes through an oiler 161 where oil is added to the air for lubricating several piston-cylinder actuators. The first branch divides into several sublines. A four-way solenoid valve 162 is mounted in the line to the actuator 47 for moving the torso device 28 from the first position and to the second position. Quick exhaust valves 163 are placed in the lines of the actuators to provide a fast response.

A three-way solenoid 164 is placed in the line going to a steam valve 165. A three-way solenoid valve 166 is mounted in the line going to an air damper actuator 167.

The air damper actuator 167 is mounted within the torso device housing 33 for controlling the flow of air from the fan 32 through the steam coils 36. A three-way solenoid valve 168 controls the air pressure to the actuator 80 that moves the fly press 76 against the fly buck 74. The actuator 97 for expanding the torso buck is controlled by a three-way solenoid valve 170.

The leg expanders 106 and 107 are controlled by three-way valves 171 and 172. Valve 171 is an electrically operated solenoid valve for controlling the pressure to the actuators 121 and 122 to raise the cuff expanders 117 and 118. Valve 172 is a cam controlled valve that controls the pressure to the cuff expander actuator 135 and 136 to release the trouser cuffs. Valve 172 is mounted on the frame 20 and is actuated by a cam 173 that moves with the side chest 27 (FIG. 4).

The main line has a second branch that has a pressure regulator 175, gauge 176 and a three-way solenoid valve 177. The valve 177 controls the pressure to the side chest bellows 151 and 152.

STEAM SYSTEM

Steam is fed to the machine (FIG. 26) from an external source. The steam flows through the center buck 25 and the side chests 26 and 27. Steam also passes through the hip bucks 51 and 52, the fly press 76 and the fly buck 74. The steam is fed through the steam coils 36 to heat the air supplied from the fan 32. The steam returning from the steam coils flows to a condensate accumulator tank 221. The steam passes upward through valve 165, which controls the steam injected into the interior of the trousers during the initial operation of each cycled operation. The water accumulates in the bottom of the tank 221 and then flows out through the return condensate line 222. A water line 223 is connected to the line 222 and directs a portion of the condensate through a control valve 225 and into the flexible steam line 226 for combining with the steam to form supersaturated steam or small water particles carried by the steam for uniformly moistening the trousers prior to pressing. The valve 165 and valve 225 are operated together to inject supersaturated steam uniformly throughout the interior of the trousers.

The electrical system will be described in conjunction with the description of the operation of the machine. Initially, the operator closes the toggle switches 175 and 176 that are mounted on the front of the machine as shown in FIG. 1. As shown in FIG. 25 the closing of switch 175 energizes the motor relay 177. Relay 177 then closes contacts 177a, 177b and 177c to start the fan motor 34 to blow air to the steam coils 36. Initially, the air damper is closed so that the hot air does not pass to the forward section 31 of the torso housing 33. Switch 176 energizes the timer circuit 178.

Initially, the torso device 28 and the leg expanders 106 and 107 are in the forward positions with the cuff expanders 117 and 118 elevated as shown in FIGS. 1–4 to facilitate the mounting of the trousers. The operator mounts the trousers on the torso device 28 by placing the back of the trousers between the back press 90 and the spring clip 93. The operator brings the waistband around the hip bucks 51 and 52 and positions and aligns the front of the trousers between the front bucks 63 and 64 and the spring biased clamps 71 and 72. The operator then pushes two push buttons 180 and 181 that are mounted on the uprights 21 and 22 respectively (FIG. 1) to energize the solenoid valve 168. Valve 168 pressurizes actuator 80 to pivot the steam heated fly press 76 to press the trouser fly against the steam heated fly buck 74.

When button switches 180 and 181 are pushed, holding relay 182 is energized to close normally open contacts 183 to bypass the switches 180 and 181 to hold the solenoid energized.

With the fly press 76 against the fly buck 74, the torso portion of the trousers is securely mounted and aligned to the torso device 28.

The operator then pushes the push button switch 184 with her knee (FIGS. 1, 3 and 4) to energize the solenoid 170 to pressurize actuator 97. The actuator 97 extends the front bucks 63 and 64 and the seat bucks 85 from between the hip bucks 51 and 52 to expand and stretch the trouser torso about the stationary hip bucks 51 and 52. As previously mentioned the rear edge members 86 are self-centering to insure that the trousers are uniformly stretched from the crotch to the waistband in order not to damage or leave wrinkles in the trousers.

A holding relay 185 is energized by the depression of the push button switch 184 to close normally open contacts 186 to bypass the switch 184 to maintain the solenoid 170 energized.

The operator then places the trouser cuffs on the cuff expanders 117 and 118 with the side seams of the trouser legs aligned to complete the mounting of the trousers on the machine.

To start the automatic sequence of the operation, the operator depresses the start button 188 that is mounted on the front of the machine (FIG. 1) to energize the timer start relay 190. Relay 190 closes cam operated contacts 191 to start the timer motor 192. As illustrated in FIG. 23 the automatic sequence is designed for a 43 second interval. Of the forty-three second interval, the trousers will normally be pressed and dried for approximately 33 to 35 seconds. If the operator desires to extend the pressing and drying time, she merely sets a time delay relay 193 that is mounted on the upright 22 (FIG. 1) for interrupting the timer motor 192. Besides the contacts 191, the timer has cam operated contacts 194 through 199 that are sequentially operated as the motor 192 rotates the timer cams (not shown). Immediately at the start of the timer motor 192, the contacts 194 are closed to energize the solenoid 164 to open the steam valve 165 and the water valve 225. Supersaturated steam or steam carrying small water particles is sprayed into the interior of the trousers to uniformly moisten the trousers and balloon the trousers to remove the wrinkles prior to pressing. The steam acts as a carrier for uniformly moistening the trousers in an efficient manner. The supersaturated steam is injected into the interior of the trousers for approximately eight to ten seconds.

After two seconds the contacts 195 are closed and the contacts 196 are opened. The opening of contacts 196 deenergizes solenoid 171 to release the pressure in the actuators 121 and 122. The cuff expanders 117 and 118 then slide down by gravity to the intermediate position as shown in phantom in FIG. 20 to stretch the trousers between the waistband and the cuffs. Contacts 195 energize solenoid 162 to actuate the actuator 47 to move the torso device 28 and the leg expanders 106 and 107 from the first position to the second position so that the torso device 28 is positioned immediately over the center buck 25 with the crotch of the trousers on the saddle of the center buck, and the hip bucks 51 and 52 straddling the center buck. The leg expanders 106 and 107 are positioned and aligned with the trouser legs between the side chests 26 and 27 and the center buck 25.

As may be seen in FIG. 4, as the torso device 28 moves to the second position the bell crank 46 engages and closes switch 201. After six seconds the contacts 197 are closed to energize solenoid 177. Solenoid 177 pressurizes the bellows 151 and 152 to move the side chests 26 and 27 toward the center buck and the torso bucks. As the side chests move forward cam 173 (FIG. 4) moves against and actuates the valve 172 to pressurize the actuators 135 and 136 to release the trouser cuffs. As shown in phantom (FIG. 20) the trouser expanders 117 and 118 then drop to the bottom position near the base of the machine to be spaced from the trouser cuffs while the trouser cuffs are being pressed and dried.

It should be mentioned at this point that the supersaturated steam tends to balloon or distend the trousers to make sure there are no wrinkles in the trousers as the side chests are closing. The side chests move against the trousers and the supersaturated steam pressure to press the trousers from the cuffs to the waistband against the center buck and the torso bucks. It should be noted that there are not inserts in the trouser legs while the legs are being pressed.

After eight seconds, contacts 194 are reopened and the contacts 198 are closed. Contacts 194 deenergize solenoid 164 to close the steam valve 165 and water valve 225 to terminate the flow of the supersaturated steam into the trousers. Contacts 198 energize solenoid 167 to open the air damper to permit hot air to flow into the forward section of the torso housing 33 and into the interior of the trousers to dry the trousers as they are being pressed.

After 12 seconds, the contacts 203 are closed and the contacts 204 are opened. Contacts 204 interrupt the circuit to the timer motor 192. The contacts 203 energize the time delay relay 193. If the time delay relay 193 is set for zero, i.e., to follow the normal time sequence, then the relay 193 will immediately close contacts 205 to keep the timer motor 192 running. If the operator has preset the relay 193 for a specified period, the timer motor will stop for such a period to extend the time of the automatic sequence.

If the operator sets the timer delay relay 193 to zero the hot air will continue to flow for approximately 33 seconds to dry the trousers while the trousers are being pressed.

Atfer approximately 41 seconds from the start of the automatic cycle, the contacts 197 and 198 open to close the air damper and open the side chests respectively. Because the air lines to the bellows 151 and 152 have quick exhaust valves 163, the side chests open rapidly.

One second later at 42 seconds the contacts 195 and 199 are opened and the contacts 196 are closed. Contacts 195 deenergize solenoid 162 to pressurize the actuator 47 to move the torso device 28 and leg expanders 106 and 107 to their first position forward of the center buck and side chests. The opening of contacts 199 deenergizes relays 182 and 185 to open the contacts 183 and 186 respectively. This in turn deenergizes solenoids 168 and 170 to cause the torso device to retract the front bucks and seat bucks and to permit the fly press 76 to pivot from the fly buck 74 respectively. The closing of contacts 196 energizes solenoid 171 to pressurize the actuators 121 and 122 to raise the cuff expanders 117 and 118 into position to receive another pair of trousers. After 43 seconds the contacts 199 close and contacts 191 open in preparation for a new cycle.

As an added feature a counter 207 is mounted on the upright 21 to record the number of pressing cycles performed by the machine (FIG. 1).

Thus, it may be appreciated that the side chests 26 and 27, which may be considered as movable pressing elements, move against a fixed pressing element or center buck 25 and expandible mandrel pressing elements or torso bucks to press and finish the trousers in one operation.

CONVENIENCE AND SAFETY FEATURES

Many of the conveniences and safety features have previously been generally described. However, to emphasize several of these features a brief review will be made. One of the principal conveniences and safety features is the mounting of the torso device 28 to place the torso bucks elevated and forward of the center buck 25 to facilitate the mounting of the trousers on the torso bucks. When the torso device 28 is in the first position, the torso bucks are facing somewhat forward at an inclined angle (FIGS. 1, 3 and 4) sufficiently elevated so that the operator need not bend over to mount the trousers on the torso bucks. Also the torso device is sufficiently forward of the hot steam elements (center buck 25 and side chests 26 and 27) that the operator can readily mount the trousers without worrying about being burned. This eliminates one of the major hazards normally encountered in pressing trousers. Also, the operator is spaced from the hot elements and will not become fatigued from the heat generated from the hot elements.

Another convenience and safety feature is the movement of the leg expanders 106 and 107. The leg expanders when in the first position are retracted to an elevated position and forward of the hot side chests 26 and 27 so that the operator can conveniently and without fear of being burned place and align the trousers on the cuff expanders 117 and 118. A further safety feature is a provision for two spaced push buttons 180 and 181 (FIGS. 1 and 25) for closing the fly press 76. To close the fly press 76 the operator must simultaneously depress both buttons, which requires the use of both hands of the operator. Thus the operator cannot accidentally close the fly press on one of her hands.

As is illustrated in FIGS. 1, 3 and 4, a safety guard 210 is mounted to the front of the frame 20 projecting forward to protect the operator from the cuff expanders 117 and 118 when they are moved to the first position. An additional safety feature is incorporated in the use of the normally closed push buttons 210 and 212 that are mounted on the front of the frame 20 (FIGS. 1 and 25) so that the operator may manually open the fly press 76 and retract the front bucks and the seat bucks respectively.

To protect the operator from accidentally crushing her hand or arm between the side chests 26 and 27 and the center buck 25, elongated safety guards 214 and 215 (FIGS. 1 and 6-8) are mounted for movement in advance of the side chests to detect the presence of a foreign body projecting through the opening 29 and between the side chests and the center buck. The elongated safety guards 214 and 215 are mounted along the side of the side chests 26 and 27 respectively with their inner edges projecting forward of the side chests 26 and 27 so that when the side chests move toward the center buck 25, the inner edges will contact the foreign object before the side chests. As illustrated in FIG. 8, each of the safety guards 214 and 215 are supported on an arm 216 that is pivotally mounted on the back of the side chests for movement therewith. Switches 217 are mounted on the back of a side chest adjacent the ends of the arms 216. Springs 218 are connected to the arm ends for biasing the arm ends against the switches 217 to keep the switches closed. As illustrated in FIG. 25, the switches 217 are placed electrically in series in the circuit for operating the drive means for moving the side chests 26 and 27. Thus, if a foreign object, such as the operator's hand is projecting through the opening 29 and between the side chests and the center buck, one of the inner edges of the safety guards 214 and 215 will contact the foreign object and pivot the arm 216 to open one of the switches 217 to stop the movement of the side chests.

It is understood that the above described embodiment is simply illustrative of the principles of my invention. Numerous other embodiments may be readily devised by those skilled in the art and fall within the scope of my invention.

What I claim is:

1. In an apparatus for finishing fabric trousers in which the apparatus has a frame, a center pressing buck mounted to the frame, elongated side pressing chests movably mounted on the frame; and an unobstructed elongated front opening, a combination thereof with:
   (a) a torso expanding and pressing device mounted on the frame for movement between a first position forward of said buck and side chests and extending from the frame forward of the unobstructed elongated front opening and a second position between the movable chests and overlying the center buck;
   (b) a first drive means for moving the torso device from the first position through the elongated front opening to the second position; and
   (c) a second drive means for moving the side pressing chests against the center buck and torso when the torso device is in the second position to press the trousers.

2. In the apparatus as defined in claim 1 wherein the torso device is pivotally and slidably mounted on the frame for movement from the first to the second position through the frame front opening.

3. In the apparatus as defined in claim 2 further including guide rods secured to the torso expanding and pressing device and wherein the guide rods are slidably supported in slide bearings that are pivotally mounted to the frame and wherein further the first drive means moves the torso device from the first to the second position by sliding the rods in and pivoting the rods about the slide bearings.

4. In the apparatus as defined in claim 3 wherein the first drive means includes:
   (a) a shaft rotatably mounted to the torso expanding and pressing device spaced from the slide bearings;
   (b) an arm secured to and radially extending from the shaft;
   (c) a roller rotatably mounted to the end of the arm;
   (d) a contoured track secured to the frame for receiving and guiding the roller; and
   (e) an actuator operably connected to the arm for moving the roller along the contoured track and for pivoting the arm and the shaft about the roller to slide the rods in and pivot the rods about the slide bearings to move the torso device from the first to the second position.

5. In the apparatus as defined in claim 1 further including opposing elongated safety guards movably mounted adjacent and in advance of the side chests for movement therewith to render ineffective the second drive means when the movement of the guards is resisted.

6. In the apparatus as defined in claim 5 wherein the safety guides face the front opening of the frame and are mounted on support arms that are pivotally mounted on the side chests and wherein the support arms are biased by resilient springs to move the guards in advance of the chests and wherein further the second drive means includes control devices mounted adjacent the support arms and are actuated when the support arms move against the resilient springs to stop the movement of the side chests.

7. In the apparatus as defined in claim 1 further including:
   (a) cuff expanders for receiving the trouser cuffs to align the side seams of the trouser legs; and
   (b) connecting means between the torso device and the cuff expanders for moving the cuff expanders with the torso device from a first position in front of the side chests and extending from the frame through the elongated front opening to a second position between the side chests.

8. The combination in accordance with claim 1 wherein the second drive means includes cylindrical expandible bellows mounted between the frame and the side chests for moving the side chests against the center buck.

9. The combination in accordance with claim 1 wherein the movable side chests are pivotally supported on upright rocker arms that are pivotally mounted to the frame.

10. The combination in accordance with claim 9 further comprising linkage means responsive to the movement of the side chests for moving with the lower portion of the side chests to maintain the side chests parallel to the center buck.

11. In a compact machine for pressing a fabric garment in which the apparatus has a frame, a first pressing member stationarily mounted on the frame for receiving the garment, a second pressing member movably mounted on the frame for movement to and from the stationary member to press the garment therebetween, in combination with; a fluid drive means which includes a cylindrical tion with; a fluid drive means which includes a cylindrical connected to said second pressing member that is capable of expanding for driving the second member to the first member.

12. An apparatus for fininshing fabric trousers having an upright center buck for receiving the crotch and leg portions of the trousers, and a torso expanding and pressing device positioned immediately above the center buck for stretching and pressing the torso portion of the trousers, said torso device including a housing, spaced hip bucks stationarily mounted to the housing, and spaced seat bucks that are movably mounted to the housing between the hip bucks, in combination with the improvements of spaced front bucks movably mounted to the housing between the hip bucks and a drive means for moving the front bucks and the seat bucks outwardly in opposite directions extending beyond the hip bucks to expand and stretch the torso portion of the trousers about the hip bucks.

13. In the apparatus as defined in claim 12 wherein a fly buck is stationarily mounted to the housing between the spaced front bucks and wherein further a fly press is movably mounted to the housing for pressing the fly portion of the trousers against the stationary fly buck.

14. In the apparatus as defined in claim 13 wherein a back press is movably mounted to the housing between the seat bucks for receiving and pressing the back portion of the trousers.

15. The apparatus as defined in claim 14 wherein the back press has a spring biased clip for holding the back of the trousers on the torso expanding and pressing device.

16. The apparatus as defined in claim 12 wherein the spaced seat bucks have self-centering edge members for applying a uniform stretching force to the torso portion of the trousers when the torso device is expanded.

17. The apparatus as defined in claim 14 wherein the front bucks are secured to slides that are reciprocally mounted to the housing and wherein further the drive means includes:
   (a) a shaft rotatably mounted to the housing transverse to the movement of the front and seat bucks;
   (b) an arm that is mounted to the shaft with its ends extending radially therefrom, with one end operably connected to the seat bucks;
   (c) a linkage member adjustably connected between the slides and the other end of the arm; and
   (d) a fluid actuator mounted to the housing and operably connected to the seat bucks for moving the seat bucks rearward to rotate the arm about the shaft to move the front bucks forward to stretch the torso portion of the trousers about the hip bucks.

18. In the apparatus as defined in claim 12 further including side chests that are movably mounted on opposite sides of the center buck, said side chests having lower sections for pressing the trouser legs against the center buck and improved upper sections extending upwardly and outwardly from the lower section for pressing the torso portion of the trousers against the torso bucks, each of said upper sections has a contoured first surface for pressing a portion of the trouser seat against one of the seat bucks, a contoured second surface spaced from the first surface for pressing a portion of the trousers against one of the front bucks, and a contoured third surface intermediate the first and second surface and recessed therefrom for pressing a hip portion of the trousers against one of the hip bucks.

19. In the pressing apparatus as defined in claim 1 in combination with a supersaturated steam system that is activated when the torso device moves to the second position for spraying supersaturated steam from the torso device throughout the interior of the trousers to uniformly moisten the trousers and balloon the trousers to remove the wrinkles before the second drive means is activated to move the side pressing chests against the ballooned trousers and center buck to press the trousers.

20. An apparatus as defined in claim 12 in combination with the additional improvement of a supersaturated steam injection system for ejecting supersaturated steam from the torso device into the interior of the trousers to uniformly moisten the trousers and to balloon the trousers to remove the wrinkles.

21. In a apparatus for finishing fabric trousers in which the apparatus has a frame with an elongated front opening, a center pressing buck mounted to the frame, and elongated side pressing chests movably mounted on the frame; a combination thereof with:
   (a) torso expanding and pressing device mounted on the frame for movement through the elongated front opening between a first position forward of said buck and side chests and extending from the frame and a second position between the movable chests and overlying the center buck;
   (b) cuff expanders mounted on the frame for movement through the elongated front opening between a first position forward of said side chests for receiving the trouser cuffs to stretch the trouser cuffs and align the side seams of the trouser legs and a second position between the side chests and center pressing buck;
   (c) a first drive means for moving the torso expanding and pressing device and the cuff expanders through the front opening from the first positions to the second positions; and
   (d) a second drive means for moving the side pressing chests against the center buck and torso device when the torso device and cuff expanders are in their second positions to press the trousers from the waistband to the trouser cuffs.

References Cited

UNITED STATES PATENTS

| | | | |
|---|---|---|---|
| 3,117,704 | 1/1964 | McMillan | 223—73 |
| 3,405,853 | 10/1968 | Carpenter et al. | 223—74 |
| 3,415,430 | 12/1968 | McMillan | 223—73 |
| 2,560,920 | 7/1951 | Berger | 38—21 X |
| 2,908,427 | 10/1959 | DeFino et al. | 223—73 |
| 3,115,285 | 12/1963 | Hitz | 223—73 |
| 3,220,622 | 11/1965 | Neckel | 223—73 |

MERVIN STEIN, Primary Examiner

G. V. LARKIN, Assistant Examiner